(12) United States Patent
Matthews

(10) Patent No.: US 12,184,187 B2
(45) Date of Patent: Dec. 31, 2024

(54) ACTIVE REDUCED VOLTAGE SWITCHING USING A SUPPLEMENTAL SWITCH

(71) Applicant: Power Integrations, Inc., San Jose, CA (US)

(72) Inventor: David Michael Hugh Matthews, Los Gatos, CA (US)

(73) Assignee: Power Integrations, Inc.

( * ) Notice: Subject to any disclaimer, the term of this patent is extended or adjusted under 35 U.S.C. 154(b) by 290 days.

(21) Appl. No.: 18/052,964

(22) Filed: Nov. 7, 2022

(65) Prior Publication Data

US 2024/0030801 A1   Jan. 25, 2024

Related U.S. Application Data

(60) Provisional application No. 63/391,090, filed on Jul. 21, 2022.

(51) Int. Cl.
*H02M 3/335* (2006.01)
*H02M 1/00* (2007.01)

(52) U.S. Cl.
CPC ..... *H02M 3/33592* (2013.01); *H02M 1/0009* (2021.05); *H02M 1/0019* (2021.05); *H02M 1/0022* (2021.05); *H02M 1/0058* (2021.05)

(58) Field of Classification Search
CPC ........... H02M 3/33592; H02M 1/0022; H02M 1/0058; H02M 1/0019; H02M 1/0009
See application file for complete search history.

(56) References Cited

U.S. PATENT DOCUMENTS

| 8,817,497 B2 | 8/2014 | Zheng |
| 9,444,357 B1 | 9/2016 | Matthews |
| 10,566,893 B2 | 2/2020 | Yang |
| 10,965,218 B1 | 3/2021 | Odell |
| 11,138,944 B2 | 10/2021 | Huang |
| 11,139,742 B2 | 10/2021 | Chang |

(Continued)

FOREIGN PATENT DOCUMENTS

| EP | 2717449 B1 | 12/2016 |
| WO | 2017095408 A1 | 6/2017 |

(Continued)

OTHER PUBLICATIONS

Wei Yuan, X. C. Huang, J. M. Zhang and Z. M. Qian, "A Novel soft switching flyback converter with synchronous rectification," 2009 IEEE 6th International Power Electronics and Motion Control Conference, Wuhan, 2009, pp. 551-555, doi: 10.1109/IPEMC.2009. 5157448.

(Continued)

*Primary Examiner* — Jue Zhang

(57) ABSTRACT

A controller includes a primary controller and a secondary controller to control switching of a power switch and a supplemental switch, respectively, coupled to an energy transfer element, e.g. an energy transfer element of a power converter. A ZV drive circuit are coupled to generate a ZVS signal that enables a ZV switch to store energy in the energy transfer element. The energy stored in the energy transfer element is coupled to reduce a switch voltage across the power switch prior to a next ON section of the primary drive signal. The secondary drive signal is generated in response to the drive signal and the ZVS signal.

18 Claims, 8 Drawing Sheets

(56) References Cited

U.S. PATENT DOCUMENTS

| | | | |
|---|---|---|---|
| 11,177,740 B1 | 11/2021 | Yau et al. | |
| 11,201,554 B2 | 12/2021 | Lin | |
| 2011/0228569 A1 | 9/2011 | Zheng et al. | |
| 2018/0226895 A1* | 8/2018 | Song | H02M 1/32 |
| 2020/0280263 A1 | 9/2020 | Lin | |
| 2020/0313561 A1 | 10/2020 | Moore et al. | |
| 2021/0194378 A1* | 6/2021 | Tian | H02M 1/083 |

FOREIGN PATENT DOCUMENTS

| | | |
|---|---|---|
| WO | 2020219116 A1 | 10/2020 |
| WO | 2021183882 A2 | 9/2021 |
| WO | 2022067663 A1 | 4/2022 |

OTHER PUBLICATIONS

X. Huang, W. Du, W. Yuan, J. Zhang and Z. Qian, "A novel variable frequency soft switching method for Flyback converter with synchronous rectifier," 2010 Twenty-Fifth Annual IEEE Applied Power Electronics Conference and Exposition (APEC), Palm Springs, CA, USA, 2010, pp. 1392-1396, doi: 10.1109/APEC.2010.5433411.

Power Integrations Product Data Sheets, "InnoSwitch3-PRO Family", Rev Q, Nov. 2022, San Jose, CA, USA; https://www.power.com/sites/default/files/documents/innoswitch3-pro_family_datasheet.pdf.

European Application Serial No. 11814906.1, Communication under Rule 70(2) and 70a(2) and reference to Rule 39 (1) EPC mailed Jan. 29, 2024; 2 pages.

European Application Serial No. 23186430.7, Extended European Search Report mailed Dec. 8, 2023; 8 pages.

PCT Application Serial No. PCT/US2023/069404, International Search Report and Written Opinion; mailed Oct. 12, 2023, 14 pages.

\* cited by examiner

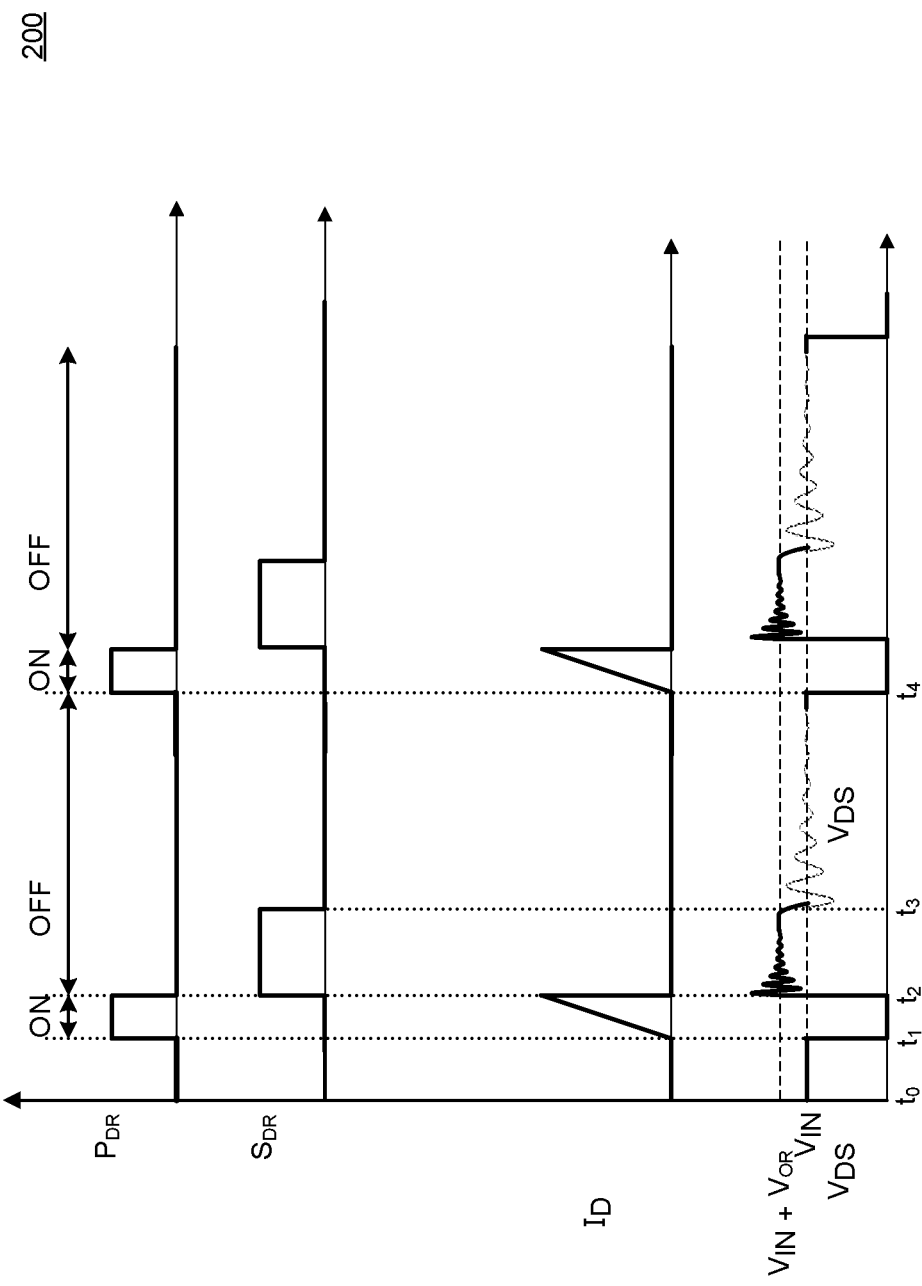

ACTIVE REDUCED VOLTAGE SWITCHING USING A SUPPLEMENTAL SWITCH

CROSS-REFERENCE TO RELATED APPLICATIONS

This application relates to controlling switch mode power converters described in the following applications filed concurrently herewith. This application claims the benefit of U.S. Provisional Application No. 63/391,090 filed on Jul. 21, 2022, assigned to Power Integrations, Inc., the contents of which are incorporated herein by reference in their entirety.

The related applications, all of which are incorporated herein by reference, are:
- 63/391,099 filed on Jul. 21, 2022, "Selective Damping of Ringing in a Power Converter," assigned to Power Integrations, Inc.
- 63/391,082 filed on Jul. 21, 2022, "Dynamically Controlling a Secondary Switch to Achieve Zero Voltage Switching," assigned to Power Integrations, Inc.

FIELD OF THE DISCLOSURE

The present invention relates generally to controlling a power converter. More specifically, examples of the present invention are related to controlling switch mode power converters.

BACKGROUND

Electronic devices (such as cell phones, tablets, laptops, etc.) use power to operate. Switched mode power converters are commonly used due to their high efficiency, small size, and low weight to power many of today's electronics. Utility companies provide a high voltage alternating current as historically, it could be transmitted long distances. In a switching power converter, a high voltage alternating current (ac) input is converted to provide a well-regulated direct current (dc) output through an energy transfer element to a load. In operation, a power switch, typically a metal oxide semiconductor field effect transistor (MOSFET), is turned ON and OFF to provide the desired output by either varying the duty cycle, e.g. the ratio of the on time of the switch to the total switching period, varying the switching frequency, or varying the number of ON/OFF pulses per unit time of the switch in a switched mode power converter.

In general, cycling the power switch between ON and OFF states results in switching losses, e.g. turn ON loss and turn OFF loss. Illustratively, turn ON loss may occur when the voltage associated with a drain capacitance (e.g., the effective capacitance between the drain and source of the power switch) is non-zero when the power switch transitions from an OFF state to an ON state. The energy stored by the drain capacitance corresponds to half of the value of the drain capacitance times the square of the voltage across the drain capacitance. The non-zero voltage across the drain capacitance may cause a spike in a switch current through the power switch. The power dissipation during the turn ON may be reduced by decreasing the value of the drain capacitance.

Turn OFF loss in the power switch may occur during the crossover time, which is the time for the switch current to fall to zero and the switch voltage across the power switch to increase from zero. The speed at which the switch voltage increases from zero is partially determined by the value of the drain capacitance. The lower the drain capacitance, the faster the switch voltage increases from zero. However, the faster the switch voltage increases from zero, the greater the power dissipation during a turn OFF transition because the turn OFF loss is a product of the instantaneous voltage and current during the crossover time. Thus, the turn OFF loss is also sometimes referred to as crossover loss. Power dissipation during a turn OFF transition may be reduced by increasing the value of the drain capacitance such that the switch current has substantially fallen to zero before the switch voltage increases from zero which minimizes the crossover time and therefore the turn OFF loss. Consequently, there have been compromises between reducing turn ON losses and reducing turn OFF losses of the power switch.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 3 shows an example timing diagram that illustrates example waveforms of a primary drive signal, secondary drive signal, VDS signal, a switch current, and a switch voltage found in an example power converter during discontinuous conduction mode.

Figure 1A:
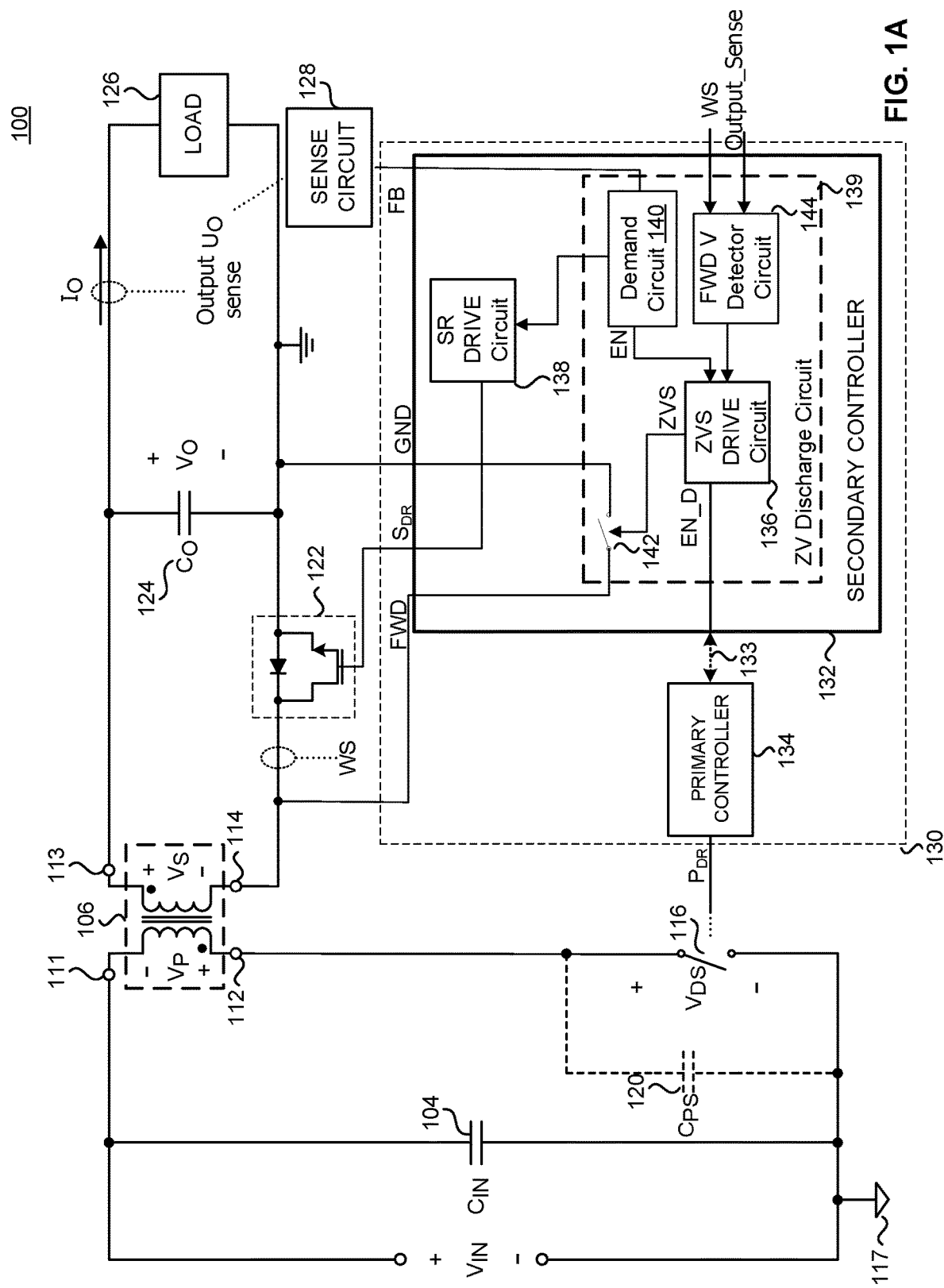
FIG. 1A illustrates an example functional block diagram of a power converter in a flyback configuration that uses a zero voltage switch circuit for discharging the power switch capacitance in accordance with teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted to facilitate a less obstructed view of these various embodiments of the present invention.

DETAILED DESCRIPTION

In the following description, numerous specific details are set forth to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that either a particular feature, structure, or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures, or characteristics may be combined in any suitable combinations and/or subcombinations in one or more embodiments or examples. The particular features, structures, or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

For illustrative purposes, the below description describes the power converter using positive logic polarity. Those of ordinary skill in the art can extend the inventive concept to use negative logic polarity.

For illustrative purposes, it is noted that the below description discusses a power converter may be used to provide output voltage and current for the purposes of providing energy to a battery powered product. It is appreciated, however, that the present invention may be applied in general to any power converter.

In various examples described herein, reduction of switching losses of a power switch is realized by reducing the voltage across the power switch just prior to the time it turns ON in accordance with the teachings of the present invention.

The reduction in VDS, e.g. the voltage across the power switch, at turn ON means that the capacitance of the power switch has a reduced effect on switching ON loss thereby reducing switching losses. This may allow the switch ON losses to be managed independently from the switch OFF losses. Thus, the capacitance across the power switch can be increased, which reduces turn OFF losses by reducing V×I crossover losses. Reducing the losses enables improved efficiency for a power converter as disclosed herein.

Figure 1B:
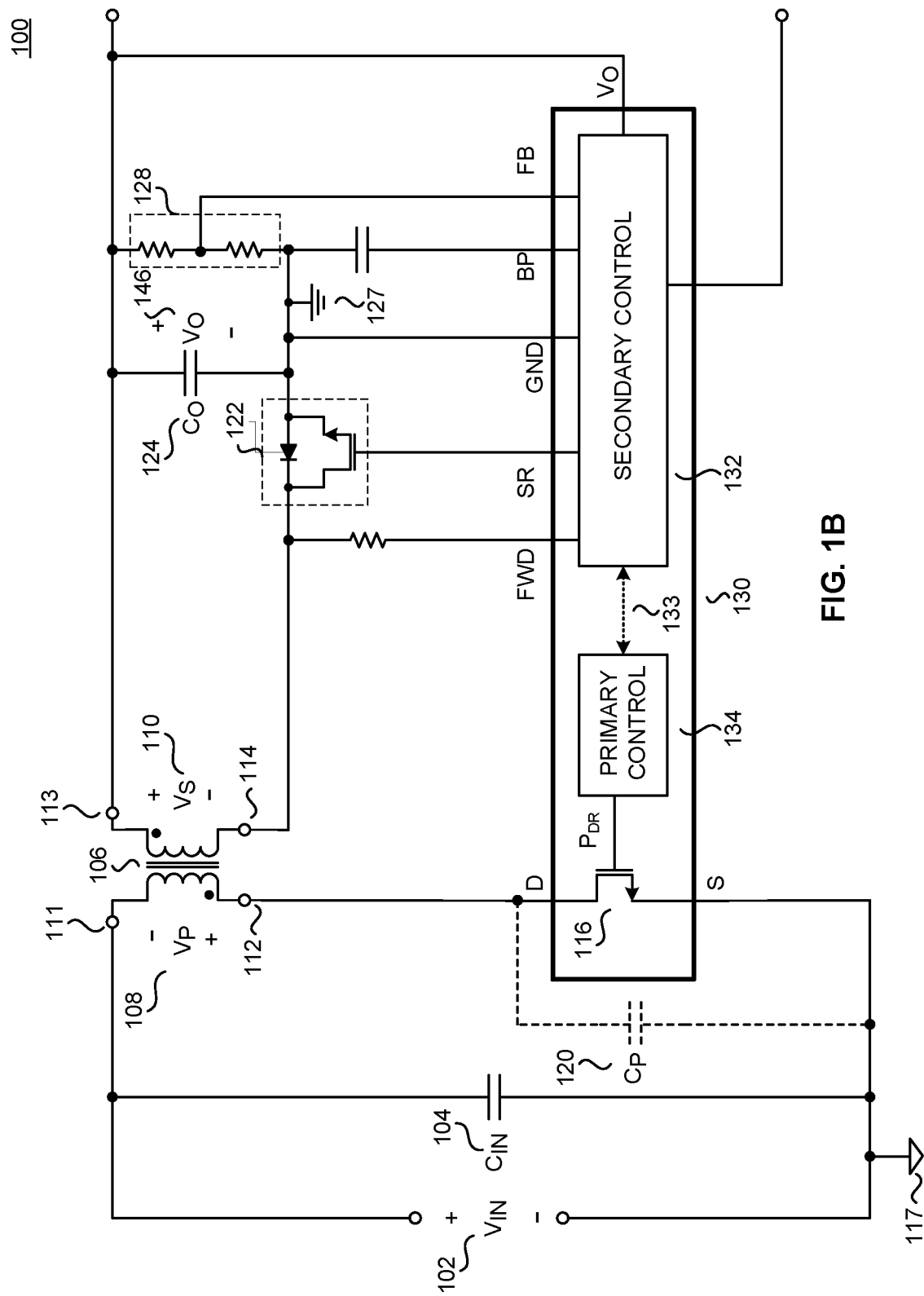
FIG. 1B illustrates a circuit schematic of the power converter in a flyback configuration shown in FIG. 1A with the power switch and control circuits contained within an integrated circuit package.

FIG. 1A illustrates an example functional block diagram of a power converter in a flyback configuration that uses a supplemental switch 412, or zero voltage switch, and a zero voltage switch drive circuit 136 for discharging the power switch capacitance in accordance with teachings of the present invention. FIG. 1B illustrates a circuit schematic of the power converter in a flyback configuration shown in FIG. 1A with the power switch and control circuits contained within an integrated circuit package.

The power converter 100 may be used to provide energy to an electronic device, e.g. a battery powered product. The effective drain capacitance $C_{PS}$ 120, which is illustrated in dashed lines, represents all the capacitance that is effectively coupled across the power switch 116. The capacitance $C_{PS}$ 120 may include the natural capacitance that is internal to the energy transfer element, energy transfer element T1 106, as well as the natural internal capacitance of the power switch 116. The capacitance $C_{PS}$ 120 may also represent discrete capacitors placed intentionally in various parts of the circuit to filter noise and to slow transitions of switching voltages.

In the illustrated example, the power converter 100 also includes a primary controller 134 and a secondary controller 132. The primary controller 134 controls the switching of the primary switch 116, while the secondary controller 132 controls the switching of a supplemental switch, e.g. the zero voltage (ZV) switch 142 and the switching of a synchronous rectifier 122. The primary controller 134 and secondary controller 132 may communicate via a galvanically isolated communication link 133.

The primary controller 134 and secondary controller 132 may be formed as part of an integrated circuit that is manufactured as either a hybrid or monolithic integrated circuit (such as in a non-isolated flyback converter), as shown as controller 130. In one example, the primary switch 116 may also be integrated in a single integrated circuit package with controller 130. In another example, the ZV switch 142 may be integrated in a single integrated circuit package with controller 130. It should be appreciated that both the primary controller and the secondary controller need not be included in a single controller package and may be implemented in separate controller packages. Further, the primary controller 134 and the secondary controller 132 may be formed as separate integrated circuits.

The secondary controller 132 may include a synchronous rectifier driver circuit 138 and a ZV discharge circuit 139. The ZV discharge circuit 139 includes a demand circuit 140, a supplemental switch, e.g. zero voltage switch (ZVS) 142, a ZVS drive circuit 136 and a Forward Voltage Detector circuit 144.

The demand circuit 140 receives the feedback signal FB (representing of the output quantity $U_O$) and produces an enable signal EN. The output quantity $U_O$ may represent either the output voltage $V_O$ of the power converter 100, output current $I_O$ of power converter 100, or a combination of both. The demand circuit 140 selects between enabling of the primary switch 116 and the secondary switch 122. In one example, the enable signal EN is a digital waveform where a rising edge in the enable signal EN corresponds to enabling the primary switch 116 to turn ON.

The ZVS drive circuit 136 and ZV switch 142 are used to reduce the switch voltage $V_{DS}$ prior to a next turn ON transition of a power switch 116. The ZVS switch 142 may conduct current to the secondary winding 110 of transformer or energy transfer element 106 such that the current enters terminal 113 and leaves terminal 114. The current stores energy in the energy transfer element 106. The ZVS drive circuit 136 is turned ON long enough such that the energy stored in the energy transfer element 106 is substantially equal to the energy stored in the drain capacitance $C_{PS}$ 120.

The ZVS drive circuit 136 is turned OFF after storing energy in energy transfer element 106. Next, the stored energy in the magnetic circuit of energy transfer element 106 produces a current in the primary winding 108, the current entering terminal 112 and leaving terminal 111, which depletes the energy stored in the drain capacitance $C_{PS}$ 120 and reduces the switch voltage $V_{DS}$ reduced. Therefore, there is reduced switching loss during the turn ON transition of the power switch 116 since the switch voltage $V_{DS}$ is reduced when the power switch 116 is turned ON. In addition, turn OFF losses of the power switch 116 may also be reduced. Since the switch voltage $V_{DS}$ is substantially reduced, the value of the effective drain capacitance $C_{PS}$ 120 may be increased and the turn OFF losses of the power switch 116 may also be reduced accordingly.

The FWD V detector circuit 144 determines the time for which the ZVS switch 142 is turned ON for storing energy in the energy transfer element 106 and the discharging time of the energy associated with the capacitance of the power switch 116. These times are a function of either the value of the output current $I_O$, the input voltage $V_{IN}$, or the length of time between the ON section of the primary drive signal $P_{DR}$ and the second ON section of the secondary drive signal $S_{DR}$ that follows. The input voltage $V_{IN}$ may be sensed using the voltage across the secondary winding (e.g., FWD pin in FIG. 1i). As the input voltage $V_{IN}$ increases, the time that the ZVS drive circuit is enabled may also increase and vice versa. As output current $I_O$ decreases, time for which the ZVS switch 142 is turned ON may increase and vice versa. In one example, the output voltage $V_O$ may be low since it may have been some time since the last enabled switching cycle and some of the capacitances (e.g., a capacitance in a primary winding clamp or a bias winding capacitor) may have discharged. As such, it may take longer to store enough energy in the energy transfer element 106 to discharge the energy of the capacitance $C_{PS}$ 120 when the output voltage $V_O$ is low.

Figure 2A:
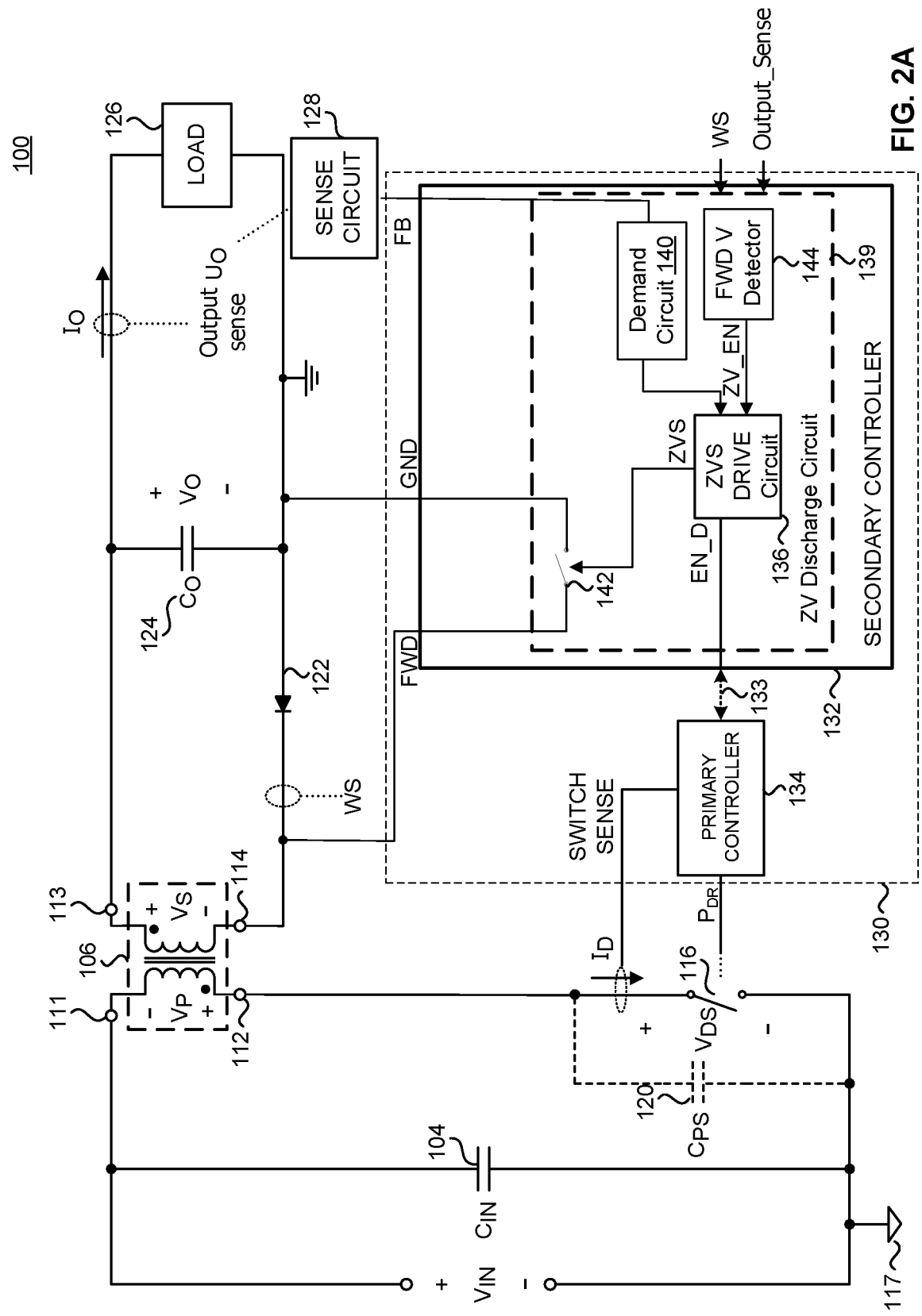
FIG. 2A illustrates another example of a power converter in a flyback configuration that uses a zero voltage switch circuit for discharging the power switch capacitance in accordance with teachings of the present invention.
Figure 2B:
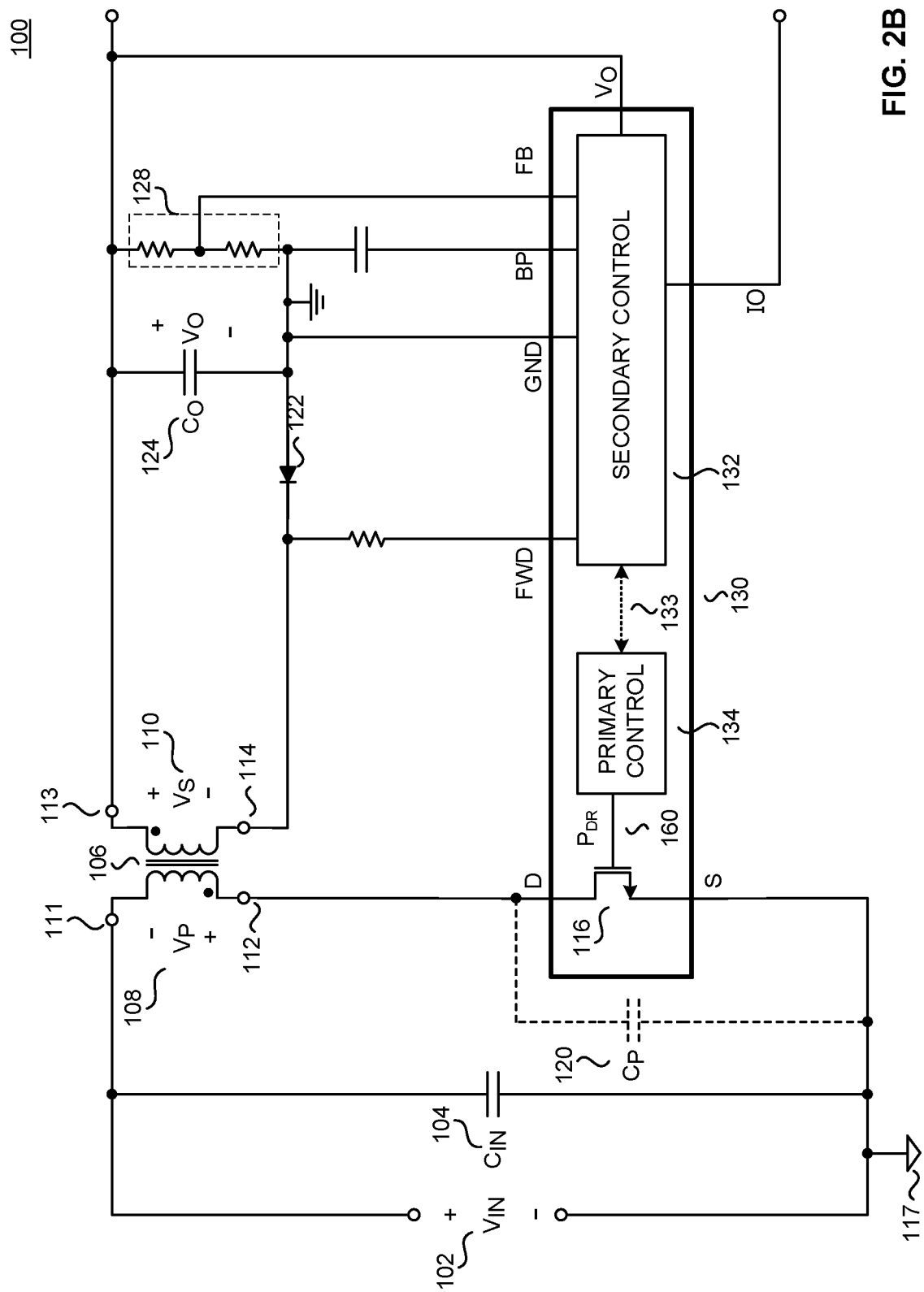
FIG. 2B illustrates a circuit schematic of the power converter in a flyback configuration shown in FIG. 2A with the power switch and control circuits contained within an integrated circuit package.

FIG. 2A illustrates an example of a power converter in a flyback configuration that uses a zero voltage switch circuit for discharging the power switch capacitance in accordance with teachings of the present invention. FIG. 2B illustrates a circuit schematic of the power converter in a flyback configuration shown in FIG. 2A with the power switch and control circuits contained within an integrated circuit package.

In the illustrative example, the power converter 100 is in a flyback configuration that uses a diode as a secondary switch.

The power converter 100 also includes a primary controller 134 and a secondary controller 132. The primary controller 134 controls the switching of the primary switch 116, while the secondary controller 132 controls the switching of the secondary switch 122. The secondary switch 122 may be exemplified as a diode. The primary controller 134 and secondary controller 132 may communicate via a galvanically isolated communication link 133. The primary controller 134 and secondary controller 132 may be manufactured as described above.

The secondary controller 132 may include a ZV discharge circuit 139 configured to include a demand circuit 140, a zero voltage switch 142, a zero voltage switch (ZVS) drive circuit 136, and a Forward Voltage Detector circuit 144.

Illustratively, the diode 122 turns ON after the primary switch 116 is turned OFF such that all the energy stored in the energy transfer element 106 while the primary switch 116 is ON is transferred to the output of the power converter 100 (for example, transferred to the output capacitor $C_O$ 124 and the load 126). In this example, the current in the secondary winding 110 enters terminal 114 and leaves terminal 113 while the secondary diode 122 is conducting.

FIG. 3 shows an example timing diagram 200 that illustrates the signal behavior of example waveforms of a primary drive signal $P_{DR}$, secondary drive signal $S_{DR}$ (that is asserted if a synchronous rectifier is used at the output of the power converter), the primary switch current $I_D$, and the primary switch voltage $V_{DS}$ found in an example power converter without ZV discharging. The time interval $t_0$ to $t_4$ exemplifies discontinuous conduction mode (DCM) operation.

During the time interval $t_1$ to $t_2$, the primary drive signal $P_{DR}$ places the primary switch in conducting mode. The secondary synchronous rectifier or diode is not conducting and the voltage across the primary switch $V_{DS}$ is low.

During the time interval $t_2$ to $t_3$, when the diode or (or synchronous rectifier) at the secondary side conducts the voltage across the primary winding is the output voltage $V_O$ reflected to the primary side by the turns ratio (the number of turns on the primary winding divided by the number of turns on the secondary winding) of the energy transfer element.

During the time interval $t_3$ to $t_4$, neither the primary drive signal $P_{DR}$ nor the secondary drive signal $S_{DR}$ are asserted. In a power converter using output diode rectification, during the time interval t3 to t4, neither the primary drive signal $P_{DR}$ is asserted or the output diode is conducting. The power converter is in discontinuous conduction mode.

Figure 4:
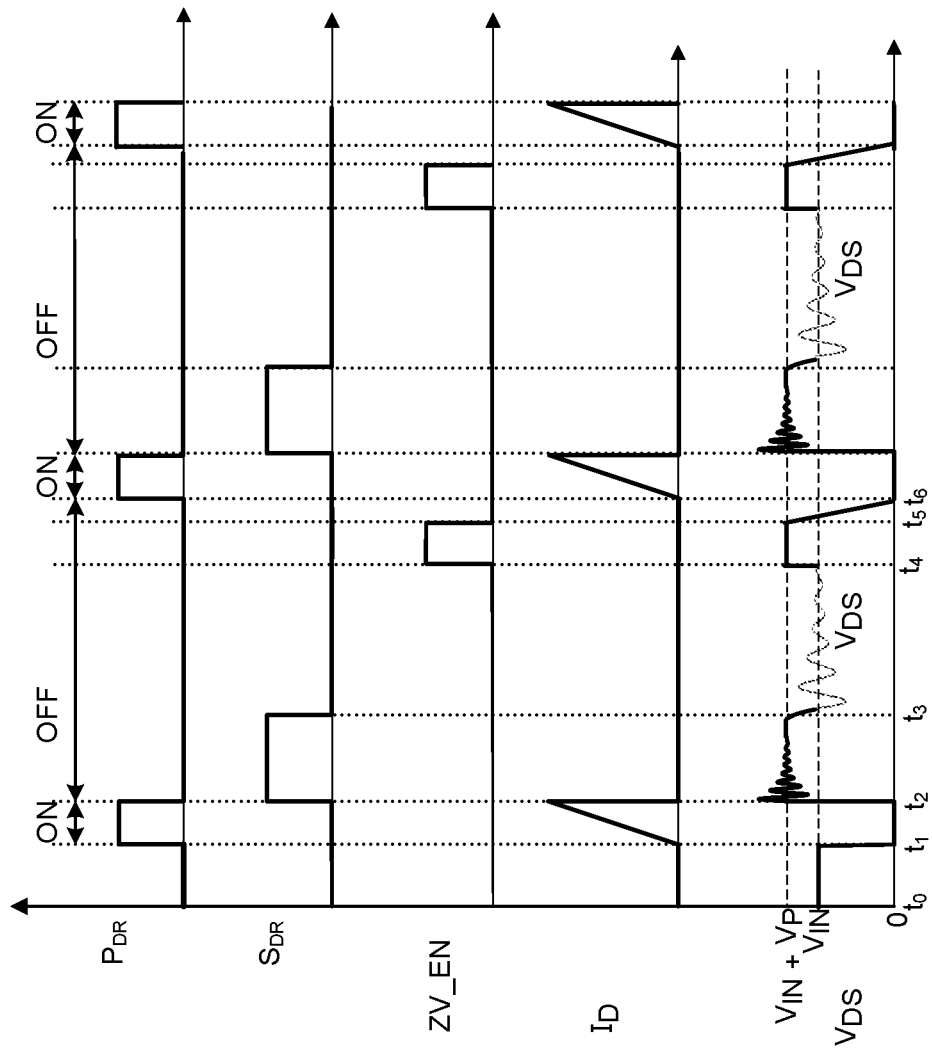
FIG. 4 illustrates an example timing diagram showing example waveforms of the primary drive signal, secondary drive signal, discharge enable signal, switch current, and switch voltage in accordance with teachings of the present invention.

FIG. 4 shows an example timing diagram 400 that illustrates the signal behavior of example waveforms of a primary drive signal $P_{DR}$, secondary drive signal $S_{DR}$ (that is asserted if a synchronous rectifier is used at the output of the power converter), the primary switch current $I_D$, and the primary switch voltage $V_{DS}$ found in an example power converter with ZV discharging as disclosed by the present teachings. The time interval $t_0$ to $t_4$ exemplifies discontinuous conduction mode (DCM) operation.

During the time interval $t_1$ to $t_2$, the primary drive signal $P_{DR}$ places the primary switch in conducting mode. The secondary switch is not conducting and the voltage across the primary switch $V_{DS}$ is substantially zero.

During the time interval $t_2$ to $t_3$, when the diode or (or synchronous rectifier) at the secondary side conducts (indicated by the secondary drive signal $S_{DR}$), the voltage across the primary winding is the input voltage ($V_{IN}$) plus the output voltage $V_O$ reflected to the primary winding.

During the time interval $t_3$ to $t_4$, the diode or synchronous rectifier at the secondary side is not conducting (indicated by the waveform of the secondary drive signal $S_{DR}$), the voltage across the primary winding is the input voltage ($V_{IN}$) plus a ringing voltage from the resonance between capacitance of the primary power switch and the inductance of the energy transfer element. Neither the primary drive signal $P_{DR}$ nor the secondary drive signal $S_{DR}$ is asserted during this time interval. In a power converter using output diode rectification, during the time interval $t_3$ to $t_4$, neither the primary drive signal $P_{DR}$ is asserted or the output diode is conducting. The power converter is in discontinuous conduction mode.

During the time interval $t_4$ to $t_5$, just prior to placing the primary switch in conducting mode, the demand circuit 136 sends an EN signal to the ZVS drive circuit. The duration of the asserted EN signal is determined by the forward voltage detector circuit. The asserted EN signal configures the secondary winding to store energy in the energy transfer element. When the EN signal is deasserted, the energy produces a current in the primary winding thereby discharging the primary switch capacitance.

The ON or asserted sections occur in the ZV_EN signal just before each ON section in primary drive signal $P_{DR}$. The ON durations of the ZV_EN signal indicate when current enters terminal 113 and leaves terminal 114 of the secondary winding 110. Energy is then stored in the energy transfer element 106 such that when the supplemental switch or ZV switch 142 is turned OFF, the energy stored in the energy transfer element causes a current to enter terminal 112 and leave terminal 111, which reduces the switch voltage $V_{DS}$ 118 by discharging the capacitance across the primary switch 116.

In the example, when the ZVS drive circuit 136 is turned ON just before each ON section of primary drive signal $P_{DR}$ in response to the ZVS_EN signal pulses, the switch voltage $V_{DS}$ substantially increases to the input voltage $V_{IN}$ plus the reflected voltage on the primary winding $V_P$ for the length of time the ZVS SIGNAL is logic high.

Figure 5:
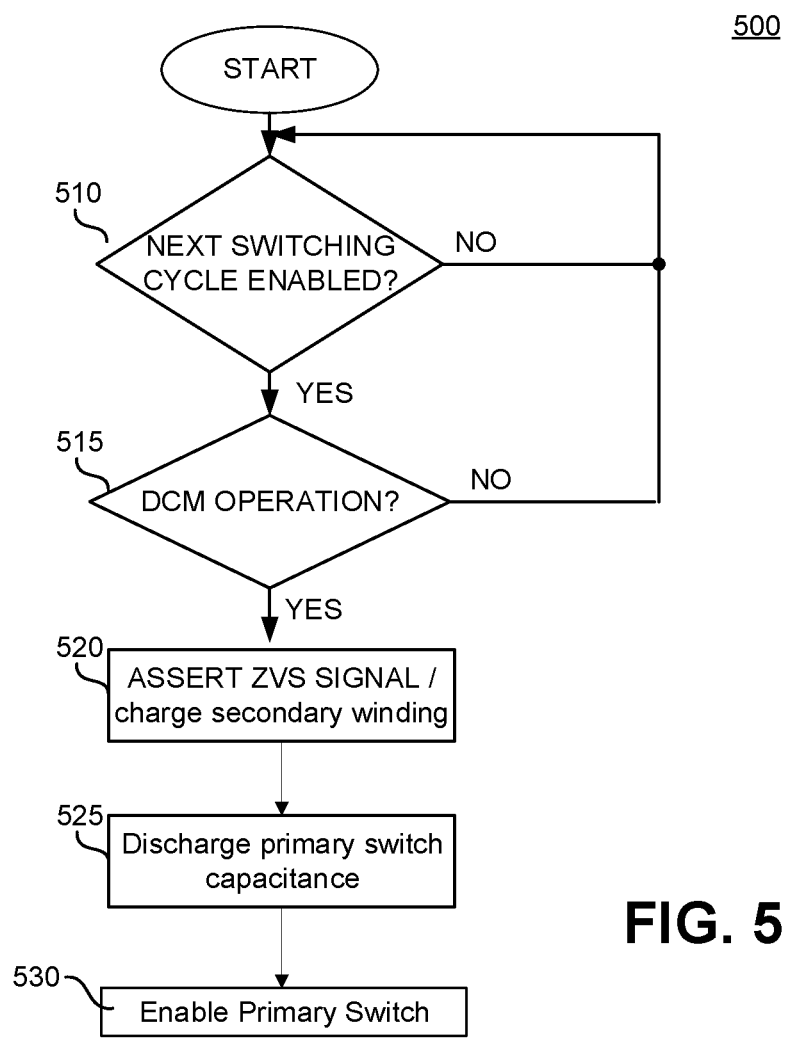
FIG. 5 illustrates a flow diagram of one example decision process of the ZVS discharge circuit in accordance with teachings of the present invention.

FIG. 5 illustrates an example of a flow diagram 500 for the decision process of the FWD V detector circuit which controls the ZVS switch circuit 140 of FIG. 2A.

In step 510, it is determined if the next switching cycle is enabled. If no, repeat step 510. If yes, in step 515, it is determined if the power converter is in discontinuous conduction mode (DCM). If no, repeat step 510. If yes, in step 520, the ZVS_EN signal is asserted. In step 525, the ZVS_EN signal is deasserted starting the discharge of the primary switch capacitance. In step 530, the primary switch is turned ON.

Figure 6:
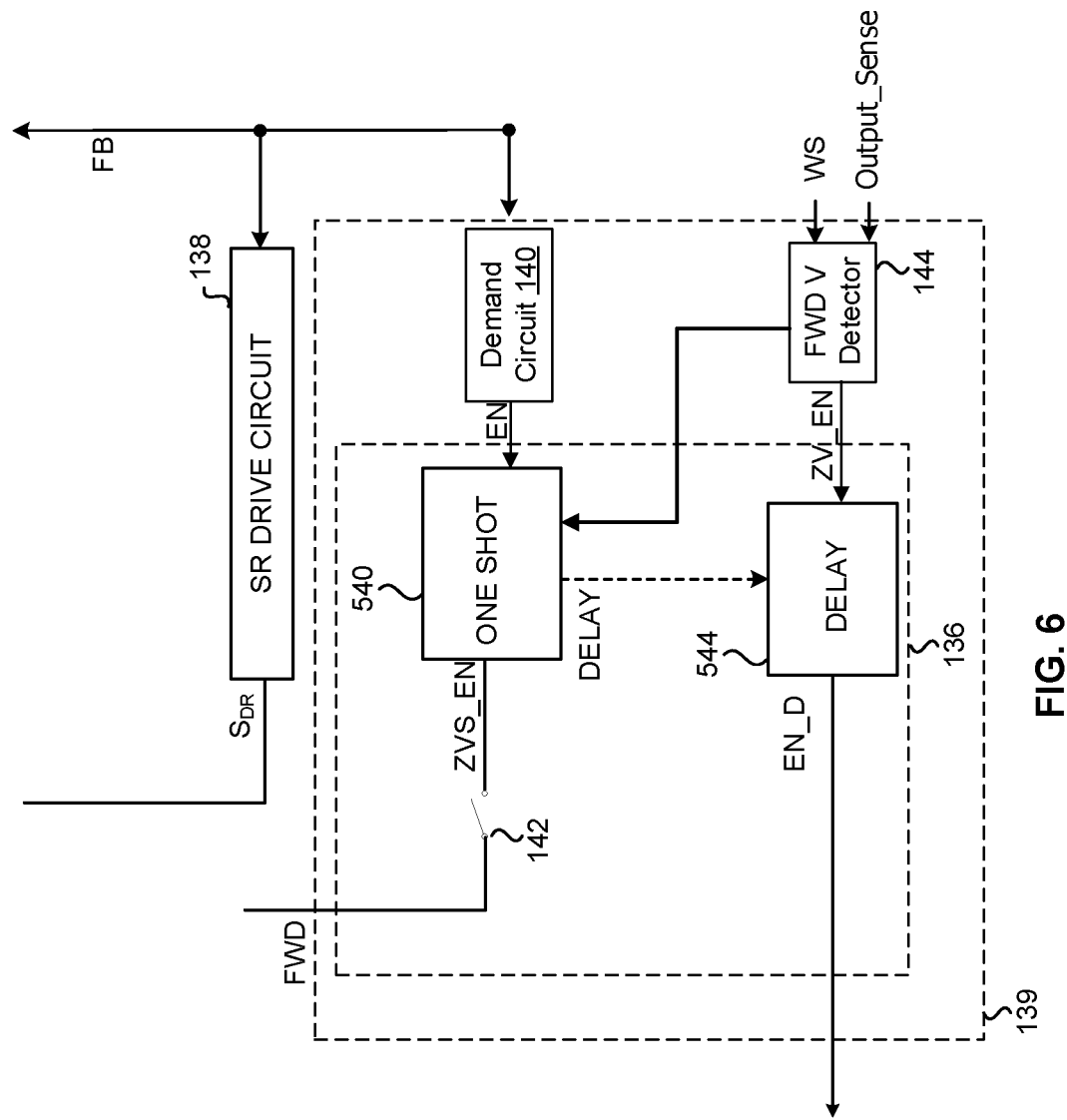
FIG. 6 illustrates a circuit example of the secondary controller shown in FIG. 2A.

FIG. 6 illustrates an example of secondary controller that includes control for the synchronous rectifier shown in FIG. 2A.

In FIG. 6, the discharge circuit receives the winding sense, output current $I_O$ sense, and feedback FB signal. The ZVS drive circuit 540 is shown as a monostable multivibrator, which may also be referred to as a one shot. The monostable multivibrator 540 produces the ZVS_EN signal with a pulse having length in response to a leading edge of the enable signal EN. An optional DELAY circuit is shown that is configured to delay the drive to the primary switch until after the ZVS switching has occurred.

In operation, the ZVS drive circuit provides a ZVS signal. In the illustrative example, the logic high pulse corresponds to the time during which energy is stored in the energy transfer element via the secondary winding. The energy storing time may be a predetermined length or may be responsive to either the winding sense signal, the output current $I_O$ sense signal, or both. By way of illustration, the energy storing time may increase with increasing input voltage $V_{IN}$ or increase with decreasing output current $I_O$ or increases as the length of time between the ON section of the primary drive signal and the following second ON section (due to ZVS_EN signal) of the secondary drive signal $S_{DR}$ increases.

The delay circuit 544 is coupled to receive the enable signal EN and may delay the enable signal EN. Its output may be referred to as the delayed enable signal EN_D. The length of delay, referred to as the delay time, may be fixed or variable. In one example, the ZVS_EN signal may enable or disable the delay circuit. If the ZVS_EN signal is not asserted, the delay circuit 544 does not delay the enable signal $U_{EN}$. However, if the ZVS_EN signal is asserted, the delay circuit 544 prevents the enable signal EN from enabling the turn ON of the primary switch until the synchronous rectifier is turned OFF or, in a case where an output diode is employed instead of a synchronous rectifier, until the output diode has stopped conducting current. Further, the delay circuit 544 may prevent the turn ON of the primary switch until the switch voltage $V_{DS}$ 118 has been reduced in accordance with the teachings of the present invention. The delay time of the delay circuit 544 may be a function of the ZVS_EN SIGNAL.

In operation, the length of time after the ZVS_EN SIGNAL has been de-asserted corresponds to the discharging time of the primary switch capacitance. The discharging time may be responsive to either the winding sense signal (representing the input voltage VIN), the output current sense signal (representing the output current $I_O$), the length of time between the ON section of the primary drive signal and the following second ON section of the secondary drive signal, or a combination of the three.

In operation, the length of time delay may increase as the input voltage $V_{IN}$ increases. In another example, the length of time delay increases as the output current $I_O$ decreases. In a further example, the length of time delay increases as the length of time between the ON section of the primary drive signal and the following second ON section of the secondary drive signal increases.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A controller for a power converter, the power converter having an energy transfer element and a primary side capacitance, the controller comprising:
   a secondary controller comprising;
      a forward voltage detector circuit coupled to produce a zero voltage switch (ZVS) enable signal when the power converter is in a discontinuous conduction mode,
      a ZVS drive circuit coupled to receive the ZVS enable signal and in response to the ZVS enable signal produce a ZVS drive signal, and
      a supplemental switch coupled to a secondary winding of the energy transfer element to receive the ZVS drive signal, and in response to the ZVS drive signal store energy through a current in the energy transfer element, wherein the current enables discharge of the primary side capacitance; and
   a primary controller coupled to a primary winding of the energy transfer element, wherein following the discharge of the primary side capacitance the primary controller produces a primary drive signal to store energy in the energy transfer element.

2. The controller as in claim 1, the primary controller further comprising a primary switch, coupled to the primary winding and to a primary reference ground, an internal capacitance of the primary switch comprising at least a portion of the primary side capacitance, the primary switch coupled to switch in response to the primary drive signal.

3. The controller of claim 2 wherein the energy stored through current in the energy transfer element is substantially equal to energy stored in the primary side capacitance.

4. The controller of claim 3, the forward voltage detector circuit comprising:
   a forward voltage detector coupled to produce the ZVS enable signal in response to an output parameter of the power converter, wherein
      when the ZVS enable signal is asserted, energy is stored in the energy transfer element,
      when the ZVS enable signal is deasserted, the energy stored in the energy transfer element is released as current in the primary winding, and the primary controller receives the ZVS enable signal and is coupled to produce the primary drive signal in response to the ZVS enable signal being deasserted.

5. The controller of claim 4, further comprising a delay circuit, wherein the delay circuit is coupled to receive the ZVS enable signal and assert a delayed ZVS enable signal, and the primary controller is coupled to produce the primary drive signal in response to the delayed ZVS enable signal being deasserted.

6. The controller of claim 5, wherein the delay circuit is included in one of the primary controller and the secondary controller.

7. The controller of claim 1 wherein the ZVS drive circuit is coupled to produce a secondary drive signal in response to an input voltage of the power converter.

8. The controller of claim 1 wherein the ZVS drive circuit is coupled to produce a secondary drive signal in response to an output current or output voltage of the power converter.

9. The controller of claim 1 wherein the ZVS drive circuit is coupled to produce a secondary drive signal in response to an input voltage of the power converter and an output current or output voltage of the power converter.

10. The controller of claim 1 wherein the primary controller is coupled to receive the delayed ZVS enable signal from the forward voltage detector circuit through a communication link, and wherein the primary controller is coupled to generate the primary drive signal in response to the ZVS enable signal.

11. The controller of claim 1 wherein the ZVS drive circuit comprises a monostable multivibrator circuit.

12. The controller of claim 1, the secondary controller further comprising a delay circuit coupled to receive the ZVS enable signal and to delay the ZVS enable signal.

13. The controller of claim 12, wherein the delay circuit is coupled to delay the primary drive signal from enabling the power switch until the primary side capacitance has been discharged.

14. The controller of claim 12, wherein a delay time of the delay circuit is proportional to at least one of an output current of the power converter, an output voltage of the power converter, and an input voltage of the power converter.

15. The controller of claim 12, wherein the delay circuit is coupled to increase the delay time in response to an increase in the input voltage of the power converter.

16. The controller of claim 12, wherein the delay circuit is coupled to increase the delay time in response to a decrease in the output current of the power converter.

17. The controller of claim 1 wherein the primary controller and the secondary controller are included in a monolithic integrated circuit.

18. The controller of claim 1 wherein the primary controller and the secondary controller are included in a single integrated circuit package.

* * * * *